Patented June 1, 1954

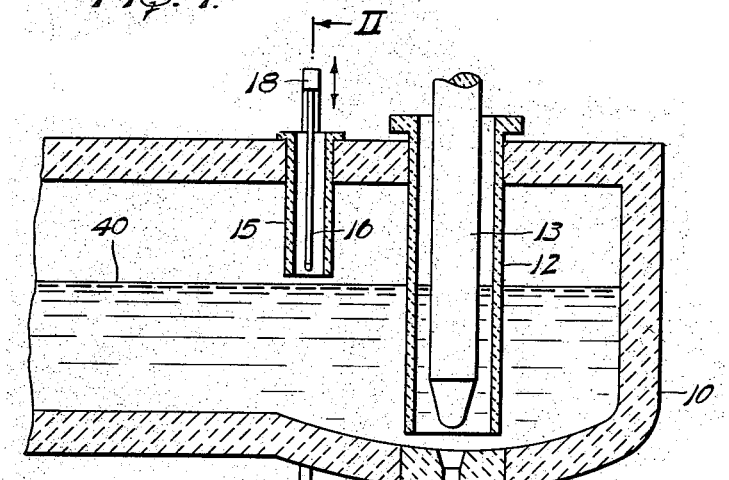

2,679,749

UNITED STATES PATENT OFFICE 2,679,749

MOLTEN GLASS VISCOSITY MEASURING APPARATUS

James P. Poole, Brockway, Pa., assignor to Brockway Glass Company, Inc., Brockway, Pa.

Application October 30, 1948, Serial No. 57,567

1 Claim. (Cl. 73—54)

This invention relates to apparatus for measuring the viscosity of molten glass.

In automatic glass feeders of the kind illustrated and described in United States Letters Patent to Karl E. Peiler, No. 1,760,254, a type well-known and widely used in the art, the weight, size, shape and temperature of the gob or charge of glass being fed is controlled and regulated by controlling the temperature of the glass in the feeder forehearth. This may be done by adjusting the flame or heat applied to the glass in the forehearth.

In the alternative or in conjunction with such heat regulation, the feeding of glass charges may be controlled by adjusting the position or degree of reciprocation of the weight-controlling tube or gate of the feeder. In any event, the conventional procedure is to take the temperature of the glass in the feeder forehearth by means of a thermocouple or otherwise and use that temperature as the indicator and controlling factor in whatever mode of regulation is employed.

While this temperature method of regulation is widely used in the practical art, the fact is that the real factor which determines the rate of flow and accordingly the weight, size, and shape of the glass charges issuing from the feeder is not the temperature of the glass in the feeder but its viscosity. True, the temperature gives a direct measure of viscosity if all other conditions are constant but in practice this is not so.

Unavoidable variations in raw batch composition or unavoidable variations in the percentage composition of the molten glass reaching the feeder forehearth will alter the temperature-viscosity relationship and produce error in the control method where temperature of the glass in the feeder forehearth is used as the control-indicating factor.

The present invention recognizes this fault in prior art methods and apparatus and provides an apparatus whereby control of heat applied to the forehearth or control of the discharge tube or gate is effected directly and continuously in accordance with variations in the actual viscosity of the glass in the forehearth, independently of its temperature or at least without relying on its temperature as a measure of viscosity.

In one form the apparatus of the present invention provides means for substantially continuously withdrawing glass fibers from the glass in the feeder or elsewhere in the tank, the length of the fiber being determinative of the viscosity of the glass. By employing a constant fiber withdrawing rate the time interval from the beginning of withdrawal until the fiber breaks from the body of molten glass in the feeder may also be used to indicate viscosity.

An exemplary form of apparatus for carrying the present invention into effect is illustrated in the accompanying drawing and described in the following specification. However, it is to be understood that the principles of the present invention are not limited to the apparatus shown by way of example or otherwise than as defined in the appended claim.

In the drawing:

Fig. 1 is a fragmentary longitudinal vertical cross sectional view of the forehearth portion of a glass furnace provided with one form of the apparatus of the present invention;

Fig. 2 is a transverse cross sectional view thereof taken generally on the line II—II of Fig. 1; and Fig. 3 is an enlarged detailed view of the fiber drawing bait element.

In the several figures of the drawing like characters of reference denote like parts, and the numeral 10 designates what may comprise the forehearth of a Hartford-Empire single feeder having a submerged outlet 11 above which is a vertically adjustable flow-controlling tube 12 within which a discharge controlling plunger 13 is mounted for reciprocation toward and away from the outlet by means not shown but well known in the art concerned.

Adjacent to the foregoing discharge controlling means a refractory tube 15 extends downwardly from the top wall of forehearth 10 toward the glass therein and a bait element 16 is disposed centrally therein. Bait element 16 may comprise an elongate stem of refractory material with a platinum tip 17 at its lower end, the bait being fixed at its upper end to a bracket 18 which connects the bait element 16 with and suspends it from the upper end of a vertical push rod 20.

As shown in Fig. 2, push rod 20 may be guided by bearing brackets 21 and 22 secured to the outer wall of forehearth 10 and a lower guide bearing therefor is designated 23. Push rod 20 is adapted to be driven upwardly and downwardly by a reversible electric motor 25 operating through a reducing gear unit 26 which has an output pinion 27 in mesh with a rack formation 28 on push rod 20.

As shown in Fig. 3, an electrical conductor 30 extends upwardly through the body of bait element 16 from platinum tip 17 and leads to a conductor 31 of a control circuit for motor 25. A submerged electrode 32 leads from the molten glass body of the forehearth to a conductor 34 which comprises the other side of the motor control circuit.

In Fig. 2 a pair of current supply conductors designated 36 and 37 lead to motor 25 by way of a relay-operated reversing switch 38, the latter being adapted, in a manner well known in the electrical art, to connect motor 25 for operation in one direction when the control circuit 31, 34 is energized and in the opposite direction when the control circuit is deenergized. Control circuit 31, 34 is connected across the supply conductors 36 and 37 and to relay 38 for operating the reversing switch thereof.

The operation of the portion of the present apparatus thus far described is as follows. With bait element 16 in the position illustrated in Figs. 1 and 2, out of contact with the molten glass charge which is designated 40 in Figs. 1 and 2, control circuit 31, 34 is de-energized and relay 38 is so arranged that under these circumstances motor 25 operates to move push rod 20 in a downward direction through rotation of pinion 27. This movement continues until the tip 17 of bait element 16 contacts the glass charge 40, whereupon control conductors 31, 34 become energized by a circuit which extends from tip 17 through the glass charge 40 to electrode 32. This energizes the relay of reversing switch 38 to reverse the direction of motor 25 and thus cause bait element 16 to move upwardly.

Upon such upward movement bait element 16 will draw a fiber from the glass charge and the length of the fiber thus drawn gives an absolute determination of the viscosity of the glass charge. The height of bait element 16 and push rod 20, or more properly the distance between the lower end of bait element 16 and the upper surface of glass charge 40 at the moment when the fiber thus drawn breaks from the glass charge 40, thus indicates the viscosity of the glass charge 40. Since motor 25 is preferably of the synchronous type the time duration of this upward movement is likewise an indication of viscosity, since it is directly proportional to the length of the fiber drawn.

The vertical amplitude of reciprocation of bait element 16 and push rod 20 may be recorded and used as a control impulse in various ways. By way of example, Fig. 2 shows schematically an induction winding 42 which has a relatively fixed support and a core 43 fixed to push rod 20 by a bracket 44 is movable vertically in winding 42. The output voltage of a control circuit 45, 46 which includes winding 42 will vary with up and down movement of core 43, and this varying voltage is impressed on a forehearth burner control system in the same manner that the variable thermocouple voltage, indicating temperature of the glass in the forehearth, has previously been employed. Such a forehearth burner control system may be of the general type shown in United States Letters Patent to William T. Honiss, No. 2,098,625 dated November 9, 1937. As there shown a conventional control pyrometer to which the conductors 45 and 46 may be connected is as well known in the art as Brown Instrument Company's No. 801.

It is to be understood that the impulse resulting from the continuously reciprocating fiber drawing means, whether its magnitude be measured in distance or time, may be reduced to or translated into a burner regulating and controlling impulse in a wide variety of ways which will occur at once to the skilled glass technician. Accordingly, the foregoing examples of electrical apparatus are by way of illustration only. Instead of the induction coil 42 a variable slidewire Wheatstone bridge circuit could be substituted. Likewise, various devices sensitive to elapsed time or for measuring, recording, and transmitting impulses proportionate to elapsed time may be employed to generate the controlling impulse when a synchronous motor or other means for reciprocating the bait element at a uniform rate of speed is used.

In Fig. 3 the bait element 16 is shown as having a thermocouple 50 mounted therewith. This is merely for the purpose of producing a continuous temperature record and does not modify the operation of the foregoing viscosity measurement system and apparatus. The continuous temperature record is used merely as a check on the operation of the glass-viscosity feeder control system.

The bait of the foregoing apparatus may also perform the function of a glass level indicator although its ancillary use for this purpose, in a manner and by means of electrical connections familiar to those skilled in the glass making art, does not affect or modify the operation of the system of the present invention.

What is claimed is:

In combination, a bait to be mounted upon a forehearth for molten glass for movement toward and away from the surface of the molten glass, said bait comprising one terminal of an electric control circuit, a second terminal of said circuit in continuous contact with the molten glass, reversible drive means for raising and lowering said bait, and control means for said drive operable to cause the drive means to move the bait upwardly when the control circuit is closed and downwardly when the control circuit is open, whereby contact of the bait with the glass by downward movement causes the bait to reverse and move upwardly until the fiber drawn thereby breaks to break the control circuit and again move the bait downwardly, and viscosity measuring means responsive to variations in the amplitude of reciprocation of the bait.

References Cited in the file of this patent

UNITED STATES PATENTS

| Number | Name | Date |
| --- | --- | --- |
| 1,270,800 | Edgecomb | July 2, 1918 |
| 1,756,120 | Hayg | Apr. 29, 1930 |
| 1,944,243 | Kegel et al. | Jan. 23, 1934 |
| 1,961,015 | Stewart | May 29, 1934 |
| 1,961,894 | Wadwan et al. | June 5, 1934 |
| 2,005,494 | Chilcote | June 18, 1935 |
| 2,098,625 | Honiss | Nov. 9, 1937 |
| 2,153,922 | Green et al. | Apr. 11, 1939 |
| 2,400,910 | Booth | May 28, 1946 |
| 2,483,333 | Cannon Jr. et al. | Sept. 27, 1949 |